United States Patent [19]

Watanabe et al.

[11] Patent Number: 4,799,628
[45] Date of Patent: Jan. 24, 1989

[54] LEVEL WINDER FOR DOUBLE-BEARING FISHING REEL

[75] Inventors: Masaru Watanabe; Ichiro Tabei, both of Ashikaga, Japan

[73] Assignee: Copal Electronics Co., Ltd., Tokyo, Japan

[21] Appl. No.: 62,830

[22] Filed: Jun. 16, 1987

[30] Foreign Application Priority Data

Jun. 23, 1986 [JP] Japan .................. 61-146637
Jun. 23, 1986 [JP] Japan .................. 61-146638

[51] Int. Cl.⁴ ............................................ A01K 89/04
[52] U.S. Cl. ................................ 242/84.42; 242/220
[58] Field of Search ............ 242/84.1 A, 84.42, 84.4, 242/158.3, 221, 220

[56] References Cited

U.S. PATENT DOCUMENTS

| | | | |
|---|---|---|---|
| 2,380,670 | 7/1945 | Nelson | 242/84.42 X |
| 2,446,354 | 8/1948 | Wolfe | 242/221 |
| 2,600,774 | 6/1952 | Hard et al. | 242/84.42 |
| 2,641,417 | 6/1953 | Kinsey | 242/84.42 |
| 3,111,287 | 11/1963 | Baenziger | |
| 4,512,536 | 4/1985 | Sato | |
| 4,513,930 | 4/1985 | Sato | |
| 4,557,429 | 12/1985 | Atobe | |
| 4,583,699 | 4/1986 | Karlsson | 242/84.42 |

FOREIGN PATENT DOCUMENTS

| | | | |
|---|---|---|---|
| 671216 | 2/1939 | Fed. Rep. of Germany | 242/84.42 |
| 6043325 | 3/1985 | Japan | |
| 6054629 | 3/1985 | Japan | |

11036 3/1904 United Kingdom ............ 242/84.42

Primary Examiner—Stuart S. Levy
Assistant Examiner—Joseph J. Hail, III
Attorney, Agent, or Firm—Wenderoth, Lind & Ponack

[57] ABSTRACT

A level winder for double-bearing fishing reel is provided with a spool shaft rotatably arranged on support frames and having a spool gear meshable with a drive gear operable by a handle which is rotatably held by support frames, a traverse cam guide cylinder mounted on a traverse cam through which is extended a traverse cam shaft to one end of which is fitted a traverse cam shaft gear which is meshable with the drive gear, and with a level winder guide arm which is mounted on and rotated with the traverse cam guide cylinder connected to a traverse cam shaft bushing and which is shiftable reciprocally in lateral direction. The level winder further includes a device for engaging or disengaging the traverse cam shaft gear with the traverse cam and a device for actuating the traverse cam shaft bushing which is connected to the traverse cam guide cylinder to be rotated, and a pair of line guide arms the lower end of which are arranged through a pair of leaf springs on a base stand to be resiliently held thereby in such a way that the upper end of the line guide arms may be shifted laterally in opposite direction to form a letter V when a line guide holder which is holding the pair of line guide arms in parallel between retractable pins disposed on the holder is tilted away from the line guide arms in accordance with the tilting of the traverse cam guide cylinder.

4 Claims, 7 Drawing Sheets

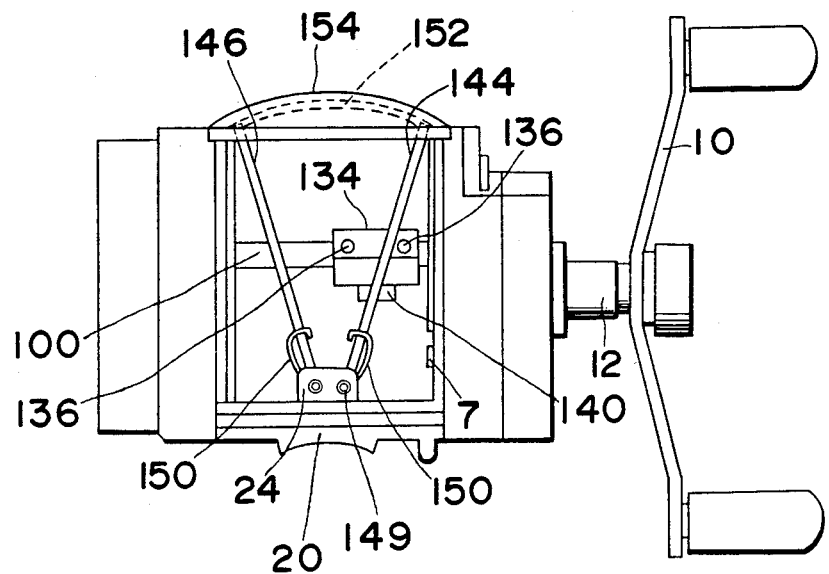
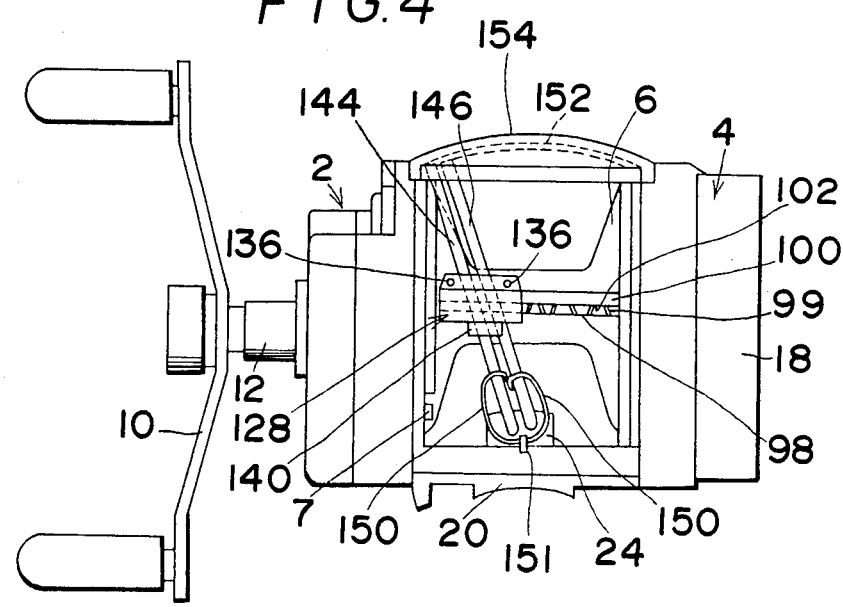

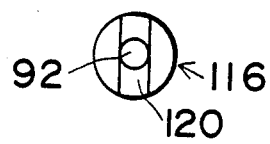
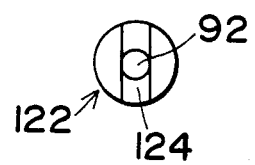
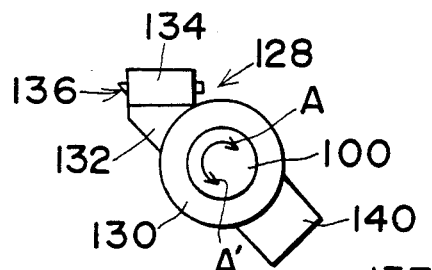
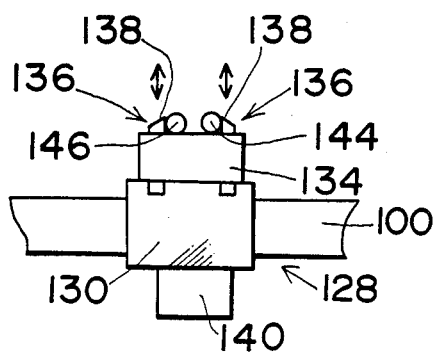
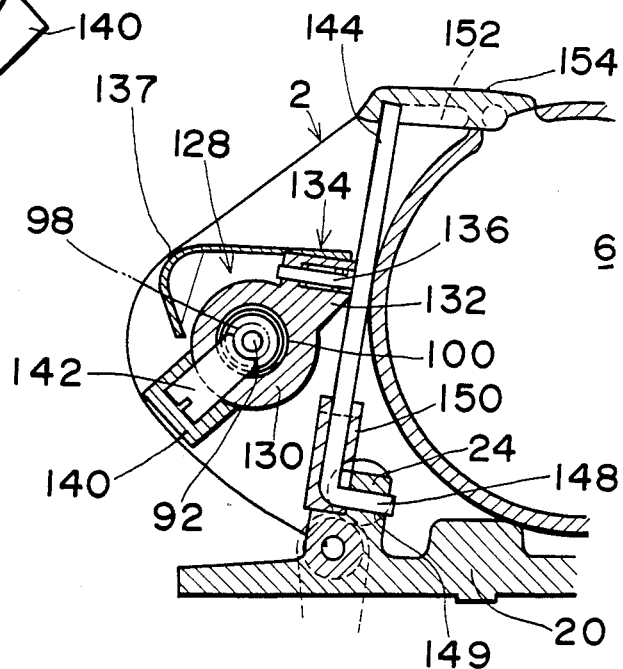

LEVEL WINDER FOR DOUBLE-BEARING FISHING REEL

BACKGROUND OF THE INVENTION

This invention relates to an improvement to a level winder for double-bearing fishing reel.

In a fishing line guide member of a conventional level winder for a fishing reel, the fishing line is let out through a guide hole in the line guide member while the line is let out. However, due to an increasing frictional resistance generated when the line pases through the guide hole, the paying out of the line is hindered thereby the paying out speed and distance are reduced. Therefore, it becomes difficult to perform a speedy casting of the lure at a predetermined distance.

A known level winder of this kind has been devised to eliminate the drawbacks. The level winder is explained in U.S. Pat. No. 4,557,429 which is based on Japanese Patents with Serial Numbers 58-122866 and 107894. In order to pay out a line during fishing, an operating lever of a clutch plate of a clutch means is pressed downward to move the clutch plate to its inner position. Consequently, an operating projections disposed on the clutch plate urge an operating plate outward to disengage a pinion from the spool shaft and thereby enables a spool to rotate. At the same time, an operating arm of the clutch plate turns an operating cam to rotate a slidable member by a guide cylinder so that locking pins which are provided in line guide arms and are engaged with a locking recess may be disengaged therefrom.

As a result, the guide arms are moved away from each other by the force of a spring toward the frame bases. Accordingly, the line can be paid out without coming into contact with cylindrical members attached to the line guide arms.

However, the structure of level winder for the fishing reel of the conventional type publicized in U.S. Patent Specification may bring forth the following drawbacks.

1. The locking pin provided in the line guide arms may fail to make proper engagement with or disengagement from the locking recess due to wear and tear of edge portions of the locking recess through frequent shifting of the locking pin in and out of the locking recess.

2. When an operating arm of the clutch plate turns an operating cam mounted on the guide cylinder to rotate the slidable member, an engagement between the operating cam and the operating arm may not be properly performed due to a slip-sliding therebetween with a result that a proper rotation of the guide cylinder may not be obtained.

3. The structure of clutch means is so complicated as to comprise various parts requiring precision accuracy such as a clutch plate having an operating arm, a dead point spring, an operating projection, a pinion mounted on a spool shaft and engageable with a driving gear of a handle shaft together with operating members etc. Therefore, an efficient production of the fishing reel with high yields may not be obtained.

SUMMARY OF THE INVENTION

It is an object of this invention to present a level winder which is so simple in structure that an efficient production and high yields may be obtained.

Another object of this invention is to provide a lever winder means wherein a line guide arm holder receives a pair of line guide arm in parallel or releases them to meet timely and smooth level winding operation.

Still another object of this invention is to provide a traverse cam guide cylinder and a traverse shaft bushing which are properly rotated by actuating means.

The objects of the invention may be obtained by the level winder for double-bearing fishing reel which is provided with spool shaft rotatably arranged on a support means and having a spool gear meshable with a drive gear operable by a handle which is rotatably held by support means, with a traverse cam guide cylinder mounted on the traverse cam through which is extended a traverse cam shaft to one end of which is fitted a traverse cam shaft gear which is meshable with the drive gear operable by the handle, and with a level winder guide means which is mounted on and rotated with the traverse cam guide cylinder connected to a traverse cam shaft bushing and which is shiftable reciprocally in lateral direction, and the level winder further includes; a means for engaging or disengaging the traverse cam shaft gear with the traverse cam; means for actuating a traverse cam shaft bushing which is connected to the traverse cam guide cylinder to be rotated and a pair of line guide arms the lower end of which are arranged through a pair of leaf springs on the base stand to resiliently held thereby in such a way that the upper end of the line guide arms may be shifted laterally in opposite direction to form a letter V when a line guide holder which is holding a pair of line guide arm in parallel between retractable pins disposed in the holder is tilted away from the pair of line guide arms in accordance with the tilting of the traverse cam guide cylinder.

BRIEF DESCRIPTION OF THE DRAWINGS

FIG. 3 is the same view as FIG. 3, with a pair of line guide arms in open state.

FIG. 4 illustrates a rear elevation view of FIG. 3.

FIG. 18 is a front view of a collar of a traverse cam shaft gear.

FIG. 19 is a front view of a collar of a traverse cam.

FIG. 20 illustrates a side elevation view of level winder guide means.

FIG. 21 is a top plan view of a lever winder guide means.

FIG. 22 illustrates a sectional view of a level winder guide means.

DETAILED DESCRIPTION OF THE PREFERRED EMBODIMENT

An embodiment of the present invention will now be described with reference to the drawings.

Figure 1:
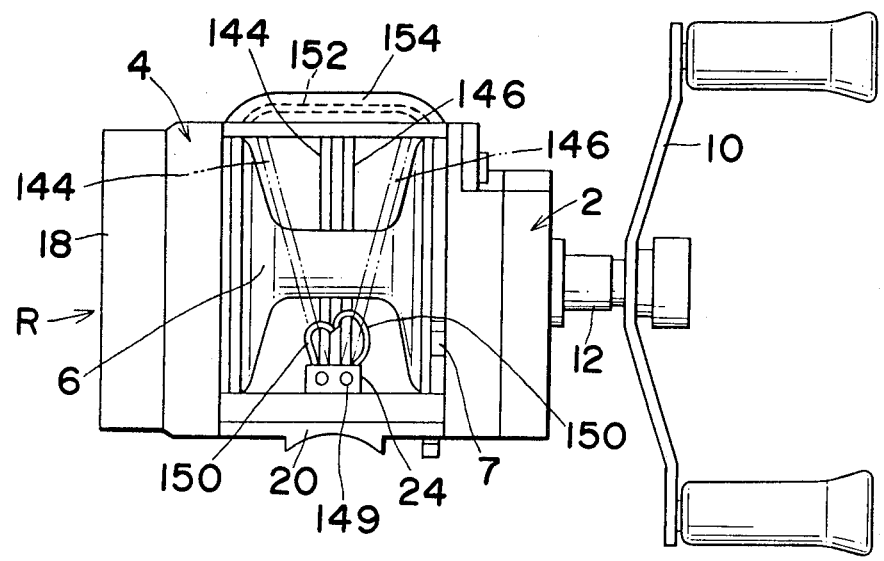
FIG. 1 illustrates a side elevation view of a fishing reel according to this invention.
Figure 5:
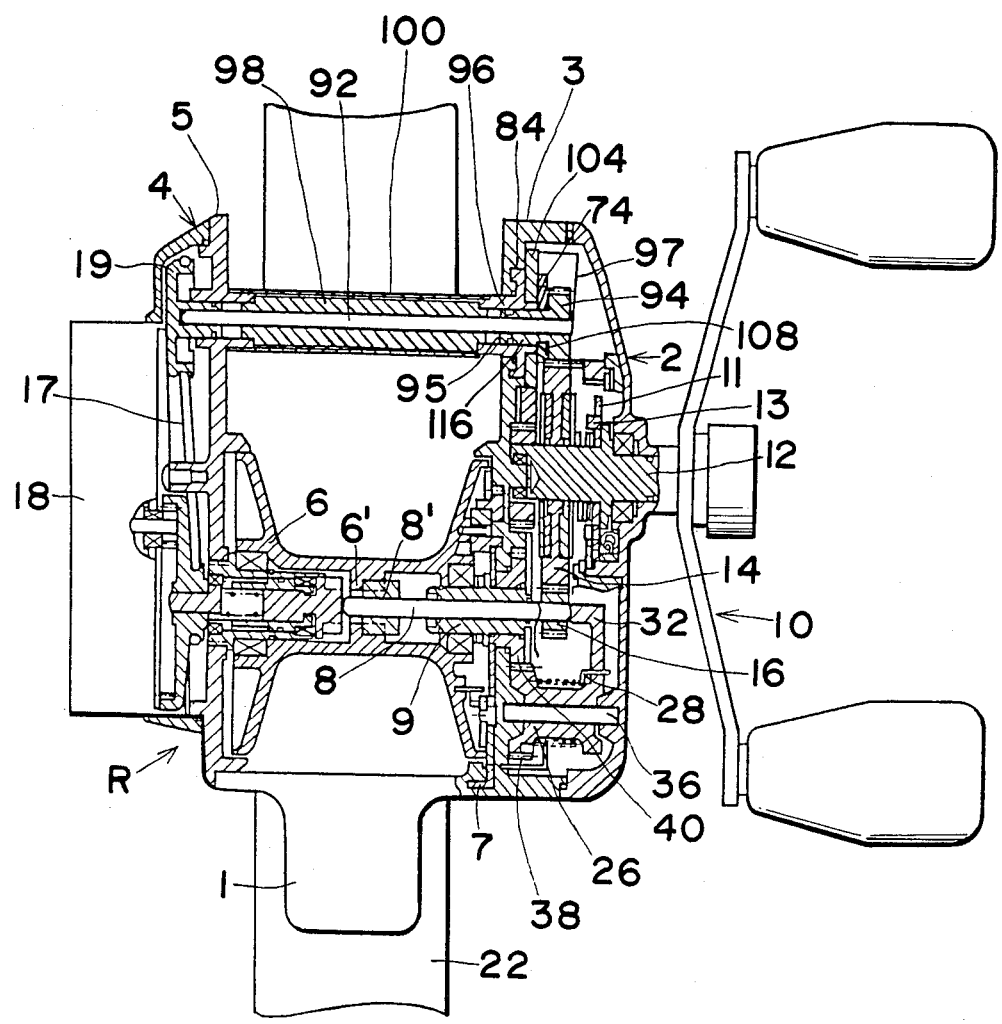
FIG. 5 shows an enlarged sectional view of FIG. 1 seen along the line V—V.

As shown in FIGS. 1 and 5, a spool shaft 8 on which a spool 6 rotatably arranged between a frame base 3 and 5 is mounted is supported by a sleeve 9 extended through the frame base 3. The spool shaft 8 is provided at its one end with a spool gear 16 which is meshable with a drive gear 14 mounted on a handle shaft 12 connected to a handle 10, and at its other end with projection 8' engageable with projection 6' on the inner wall of spool 6.

A driving motor 18 is accommodated in a case (not shown) designed to be attached outside a side cover 4. A fishing reel generally designated by a letter R is fixed to a fishing rod 22 by means of a base member 20 and as will hereinafter be described, a pair of line guide arms 144 and 146 are arranged on a base stand 24.

Figure 6:
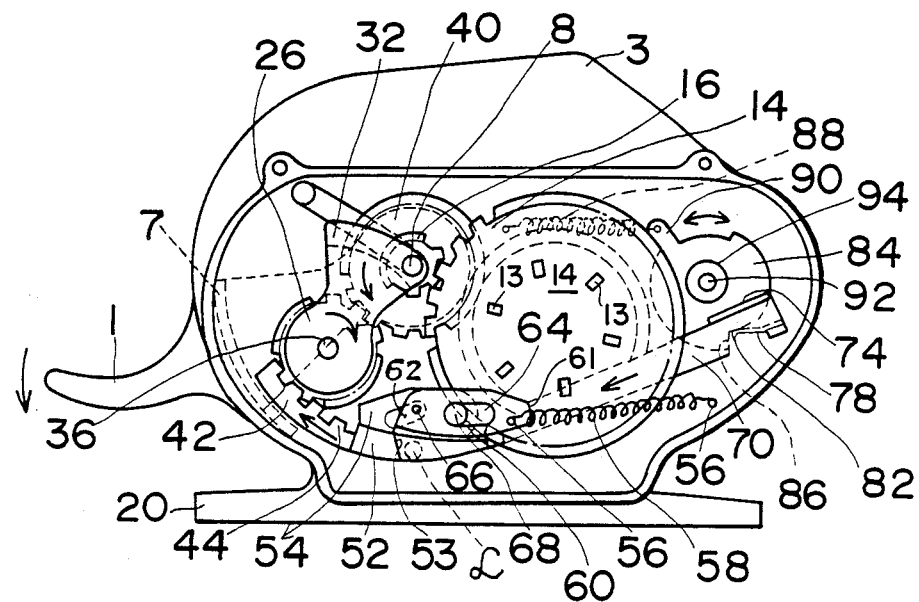
FIG. 6 is an enlarged side elevation view of FIG. 1 with a wall and a handle removed.
Figure 7:
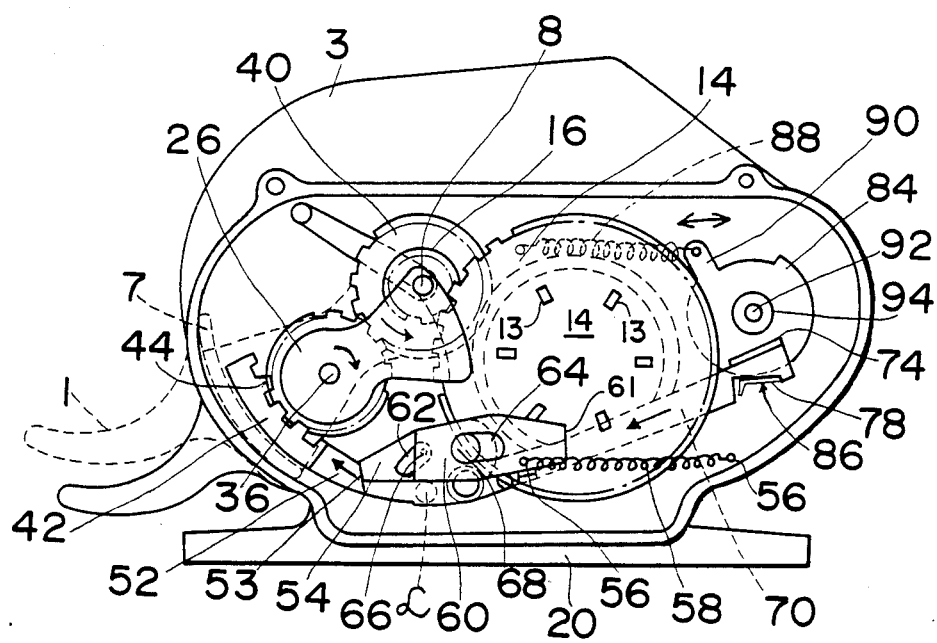
FIG. 7 is the same view as FIG. 6 with an operating lever pressed down.
Figure 8:
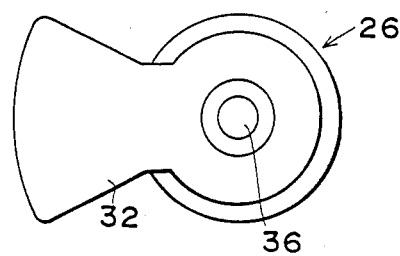
FIG. 8 is an enlarged top plan view of an operating gear.
Figure 10:
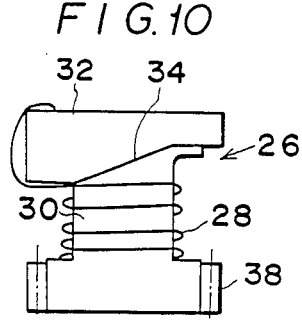
FIG. 10 is a side elevation view of an operating gear seen from a different direction.
Figure 9:
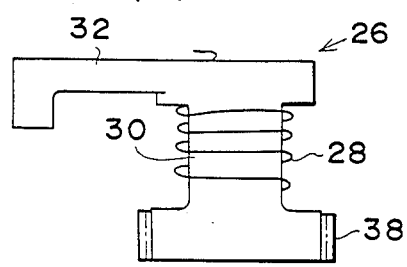
FIG. 9 illustrates a side elevation view of FIG. 8.
Figure 11:
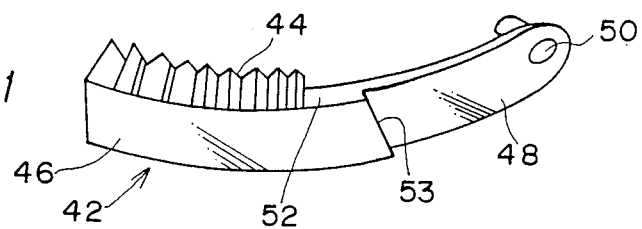
FIG. 11 is an enlarged perspective view of an inside gear.

FIGS. 6 and 7 illustrate a schematic side view of the frame base 3 with a side cover 2 and the handle 10 removed. An operating gear 26, as is shown in FIGS. 8, 9 and 10, has a cylindrical body 30 around which a torsion spring 28 is mounted, a fan shaped arm 32 the undersurface of which is formed with a tapered portion 34 and gear teeth 38 arranged at the bottom of the body 30. The operating gear 26 is arranged rotatably on a shaft 36 spanning the side cover 2 and the frame base 3. The gear teeth 38 is in meshing engagement with both a lever gear 40 mounted on a sleeve 9 of the spool shaft 8 and an inside gear 42 which will be explained in detail hereinafter. The tapered portion 34 of the fan shaped arm 32 is slidingly touchable on the surface of the spool gear 16 and the spool shaft 8 when the operating gear 26 is rotated thereby the spool gear 16 is thrown into partial disengagement with the driving gear 14. The inside gear 42, as best seen in FIG. 11, has a base 46 provided with teeth 44 thereon and a curved arm 48 having a projection 50 which engages insertably with a hole 72 defined in a third link member 70, which will hereinafter be explained in detail.

A ridge 52 having a vertical edge 53 is formed on one side of the base 46. The ridge 52 functions to prevent the base 46 from shifting back counter-clockwise with its vertical edge 53 collided with an edge of a first link member 54 when the inside gear 42 is shifted clockwise. When the inside gear 42 is at a normal stationary position, as shown in FIG. 6, the vertical edge 53 is in engagement with a projection α protruded from the frame base 3.

The first link member 54 is provided with a slit 62 and a projection 68 disposed thereon while a second link member 60 which is slidingly arranged to the first link member 54 has a projection 66 arranged on into the slit 62 to be received thereby, and a hole 64 in which the projection 68 is also insertably received. A coil spring 58 is arranged between a pin 56 positioned on the second link member 60 and another pin 56 protruding from the frame base 3. Also, as shown in FIG. 6, the two link members 54 and 60 are arranged in parallel with the inside gear 42.

Figure 12:
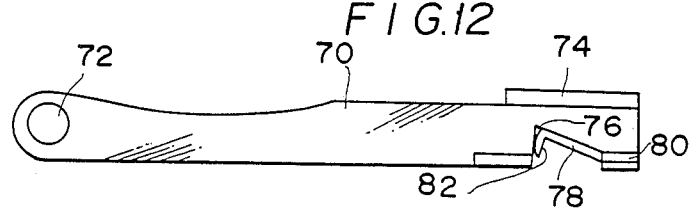
FIG. 12 is an enlarged plan view of a third link member.
Figure 13:
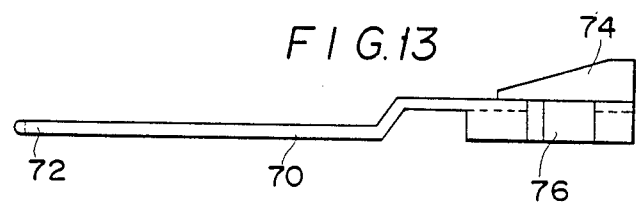
FIG. 13 illustrates a side view of FIG. 12.

At one end of the third link member 70, as best seen in FIGS. 12 and 13, is defined a hole 72 into which the projection 50 of the curved arm 48 of the inside gear 42 is inserted. At another end of the third link member 70, is defined a V shaped groove 76 which receives a hooked leaf spring 78 therein, one end 80 thereof being fastened to the third link member 70 while the other hooked end 82 of the leaf spring 78 being held inside the V shaped groove 76. A cam 74 which is positioned on the surface of the third link member 70 has a tapered portion as best seen in FIG. 13. The third link member 70 is positioned slidably on a traverse cam shaft bushing 84 and under a holder plate 104.

Figure 15:
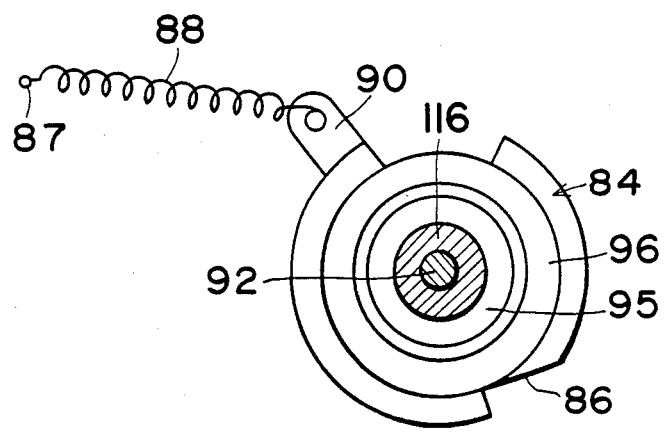
FIG. 15 is an enlarged side view of a traverse cam shaft bushing.

The traverse cam shaft bushing 84, as best seen in FIG. 15, is provided with a V-shaped groove 86 which may be engageable with or disengageable from the hooked end 82 of the leaf spring 78 disposed in the V-shaped groove 76 defined in the third link member 70.

A coil spring 88 is spanning a projection 87 disposed on the frame base 3 and a projected arm 90 arranged unitarily with the traverse cam shaft bushing 84 which is also provided with a cylindrical body 96 engageable with an edge of a traverse cam guide cylinder 100. Numeral 92 is a traverse cam shaft on which a traverse cam 98 is mounted while 95 is a circumferential recess onto which a body or collar 116 (FIG. 17) of a traverse cam shaft gear 94 is received.

Figure 14:
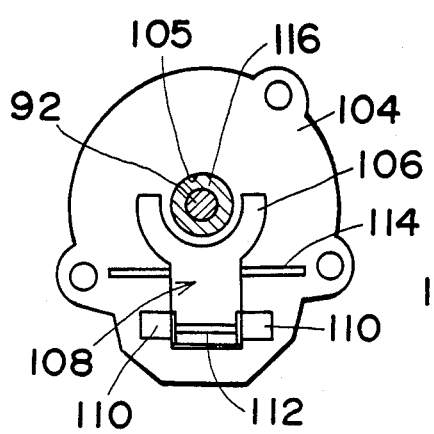
FIG. 14 is an enlarged plan view of holder plate.

A holder plate 104, as shown in FIG. 14, has a through hole 105 which receives the traverse cam shaft 92 on which is fixed mounted the collar 116 of the traverse cam shaft 94. A leaf spring 108 provided with a bifurcated arm 106 is rotatably held by a shaft 112 which is supported by a pair of holder members 110 disposed on the holder plate 104. The bifurcated arm 106 supports the collar 116 from underneath thereof. A horizontal groove 114, defined in the holder plate 104 to intersect at right angles the bifurcated leaf spring 108, may receive the cam 74 arranged on one side of the third link member 70.

Figure 16:
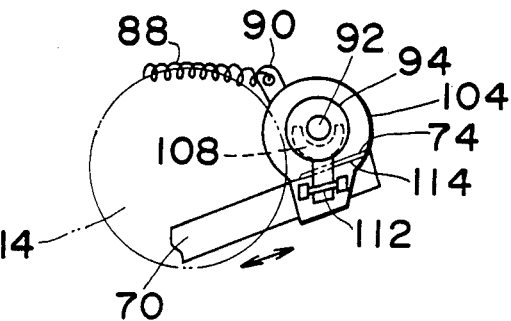
FIG. 16 illustrates a side elevation view of an assembly of a traverse cam shaft bushing, a third link member, a holder plate and a traverse cam shaft gear.

FIG. 16 illustrates a side elevation view of an assembly of the actuating members including the traverse cam shaft bushing 84 on which are positioned the third link member 70 and the holder plate 104 one after another. The tapered cam 74 of the third link member 70 is in engagement with the groove 114 defined in the holder plate 104 while the hooked end 82 of the leaf spring 78 positioned in the V-shaped groove 76 thereof is in engagement with the V-shaped groove 86 arranged in the traverse cam shaft bushing 84.

Figure 17:
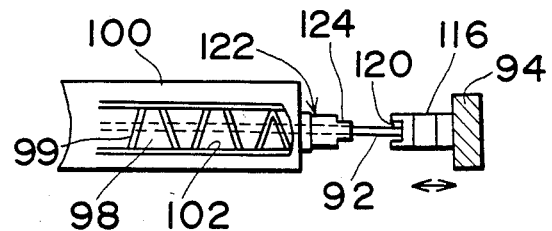
FIG. 17 illustrates a sectional view of an assembly of a traverse cam shaft gear and a traverse cam.

In FIG. 17, the traverse cam shaft gear 94 fixed to the end of the traverse cam shaft 92 is provided with a collar 116 projected therefrom. A rectangular groove 120 is defined in the collar 116. Another collar 122 arranged at the end of the traverse cam 98 faces toward the collar 116. The collar 122 is provided with a rectangular projection 124 which is engageable with the groove 120 of the collar 116. Whenever the groove 120 is disengaged from the projection 124, both the traverse cam 98 and the traverse cam shaft gear 94 may be rotated free.

A level winder mechanism of this invention will now be explained referring to FIGS. 20, 21 and 22. A level winder guide means is generally indicated by numeral 128 comprises a cylindrical body 130 mounted slantwise over the traverse cam guide cylinder 100, a slant arm 132 unitarily formed with the body 130, a line guide arm holder 134 horizontally arranged on the slant arm 132 and having a pair of pins 136 positioned therethrough, the pins 136 being retractable through the holder 134 by means of resilient means (not shown) and having tapered ends 138 respectively, and a cap 140 in which is accommodated a projection 142 which is arranged to be engaged in the groove 99 of the traverse cam 98 through a hole 102 defined in the guide cylinder 100. Bent end portions 148 of a pair of line guide arms 144 and 146 are insertably held in holes 149 disposed in the base stand 24 positioned on the base member 20. The lower end of a pair of line guide arms 144 and 146 are arranged through a pair of leaf springs 150 fitted to the base stand 24 by means of holder means 151 to be resiliently held thereby respectively in such a way that the upper end of the line guide arms 144 and 146 may be shifted laterally in opposite directions to form a shape of letter V, as shown in FIG. 3, the details of which will be explained hereinafter.

Numeral 7 is a connecting means attached to the lever gear 40, which permits the rotation thereof with the cooperation of an operating lever 1. Numeral 97 is a leaf spring resiliently pushing the traverse cam shaft gear 94 toward the traverse cam 98. Numeral 19 is a motor pulley 17, a motor drive belt.

The operation of the level winder mechanism will now be explained.

When an operating lever 1 is pressed down, as shown in FIG. 7, the lever gear 40 is rotated counter-clockwise. Simultaneously the operating gear 26 meshing with the lever gear 40 is rotated clockwise as shown by an arrow against a biasing force of the torsion spring 28 mounted around the body 30. The inside gear 42 meshing with the operating gear 26 is in turn shifted in the direction as shown by an arrow. The third link member 70 provided with the hole 72 into which the projection 50 of the inside gear 42 is inserted is also shifted accordingly.

More particular operation of the first and the second link members 54 and 60 will now be explained. The link members are designed to keep the inside gear 42 at a predetermined position.

Whenever the inside gear 42 is shifted in the direction of an arrow as shown in FIG. 7, an end portion of the first link member 54 which is arranged in parallel with the inside gear ridge 52 is shifted downward along the vertical ridge end 53 to stop the inside gear 42 from shifting backward by the collision between the ridge end 53 and the end of the first link member 54. The second link member 60 also aids the holding operation of the first link member 54. The member 60 is shiftable against the movement of the inside gear 42 by means of biasing force of the coil spring 58 through the hole 64 which shiftably holds the projection 68 of the first link member 54 and the projection 66 arranged shiftably in the hole 62 of the first link member 54 whereby the end portion of the first link member 54 is assisted to collide slidingly, with the ridge end 53 of the ridge 52 as shown in FIG. 7.

When the driving gear 14 is rotated clockwise as by the rotation of the handle 10, as heretofore explained, one of projections 13 arranged on a holder plate 11 fixed mounted on the driving gear shaft 12 touches slidably on the corner 61 of the second link member 60 to shift it to the left as seen facing to FIG. 6 and 7, whereby the end of the first link member 54 engaging with the ridge end 53 is lifted upward to release the engagement therewith through hole 64, the projection 68, the hole 62 and the projection 66, as was explained heretofore. The inside gear 42 may become freely shiftable together with the third link member 70.

When the third link member 70 is thus shifted in the direction shown by a arrow as seen in FIGS. 6 and 7, the tapered cam 74 of the third link member 70 which is held in the slit 114 of the holder plate 104 is shifted in such a way that the tapered portion thereof touches slidably, starting from the lowermost portion thereof up to the topmost portion, on the leaf spring 108 rotatably positioned on the holder plate 104 via the shaft 112 rotatably supported by the holder member 110; and as soon as the topmost portion of the cam 74 touches on the leaf spring 108 supporting the traverse cam shaft gear collar 116 from underneath by means of the bifurcated portion 106, the leaf spring 108 is shifted together with the collar 116 away from the traverse cam 98 with result that the traverse cam shaft gear 94 is disengaged from the traverse cam 98 (FIG. 17) whereby traverse cam shaft gear 94 may become semi-engaged with the driving gear 14.

As the V-shaped groove 86 of the traverse cam shaft gear bushing 84 is in engagement with the hook end 82 of the leaf spring 78 disposed in the third link member 70, the traverse cam shaft gear bushing 84 is rotated clockwise, facing to FIG. 6, on the traverse cam shaft gear 94 in accordance with the shifting of the third link member 70 to the direction shown by an arrow, thus explained, against the biasing force of the coil spring 88 and as soon as the third link member 70 is shifted a certain distance, the engagement between the hooked end 82 and the V-shaped groove 86 is released thereby the traverse cam shaft bushing 84 is restored to its former position to be rotated counter-clockwise by dint of elastic force of the coil spring 88. The movement of the traverse cam shaft bushing 84 is transmitted to the traverse cam guide cylinder 100 engaged therewith.

Whenever the traverse cam shaft bushing 84 is thus rotated clockwise, before the release of an engagement between the hooked end 82 and the V-shaped groove 86, the traverse cam shaft guide cylinder 100 rotatably mounted on the traverse cam 98 and connected to the traverse cam shaft bushing 84 is also rotated with the cylindrical body 130 of the level winder guide member 128 to the direction of letter A as shown by an arrow corresponding to the rotation of the bushing 84 (see FIG. 20), whereby the line guide arm holder 134 is shifted away from the line guide arms 144 and 146.

The guide arms 144 and 146 which are held in parallel by a pair of rotatable pins 136, 136 accommodated in the level guide arm holder 134 may be released from the holding by the pins 136 due to the rotation of the holder 134 away from the line guide arms 144 and 146 to hereby be shifted to form a letter V by means of resilient force of the leaf spring 150 fitted around the lower end of the guide arm 144 and 146 positioned on the base stand. In this state, as shown in FIG. 3, a fishing line wound around the spool 8 may be let out smoothly over the line guide cover 137. With the further shifting of the third link member 70, as explained heretofore, the engagement of the hook end 82 of the leaf spring 78 disposed in the V-shaped groove 76 defined in the link member 70 with the V-shaped groove 86 of the traverse cam shaft bushing 84 is released. Therefore, the traverse cam shaft bushing 84 returns to its former position together with the traverse cam guide cylinder 100 rotating in the direction of arrow A. Simultaneously with the rotation of the handle 10, the driving gear 14 which is partially meshed with the traverse cam shaft gear 94 is rotated in the same direction whereby the partial meshing engagement between the two gears 14 and 94 is restored to a full meshing there between with the result that the collar 116 of the traverse cam shaft gear 94 is brought into engagement with the collar 124 of the traverse cam 98. A biasing force of a leaf spring 97 aids a quick shifting of the traverse cam shaft gear 94 back to a full engagement with the traverse cam 98. The rotation of the handle 10 is thus transmitted to traverse cam 98 via the traverse cam shaft gear 94. With the rotation of the traverse cam shaft gear 94, the traverse cam 98 is rotated. The cylindrical body 130 of the level winder guide means 128 is shifted reciprocally in lateral direction sliding over the traverse cam cylinder 100 with the projection 142 which is accommodated in the cap 140 and projected through the hole 102 defined in the guide cylinder 100 to touch slidably in the groove 99 disposed in the traverse cam 98 which is rotating.

Figure 2:
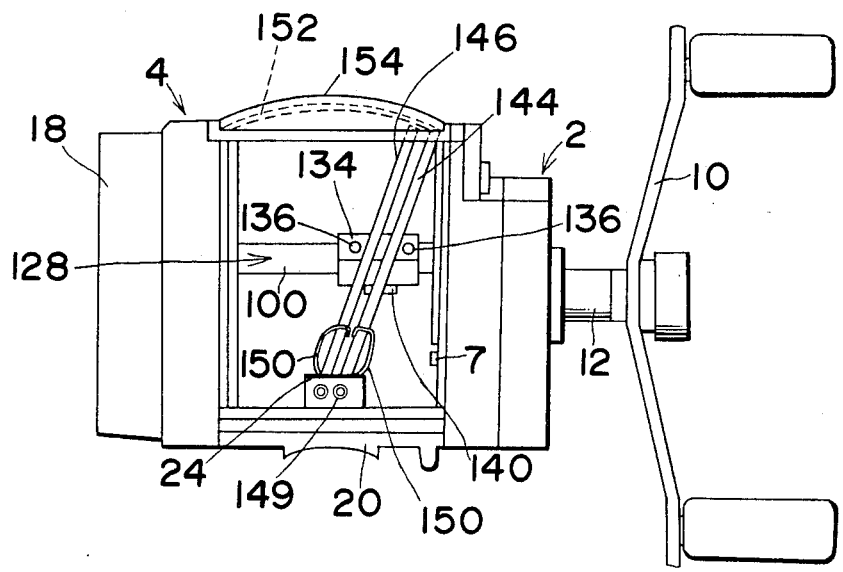
FIG. 2 is a side elevation view of a fishing reel with a spool removed.

While the body 130 mounted over the traverse cam guide cylinder 100 makes a reciprocal lateral movement along the traverse cam 98, the level guide arm holder 134 starts to accommodate a line guide arm 144 and 146 one by one so that the arms 144 and 146 are arranged in parallel on the line guide arm holder 134, as shown in FIGS. 1, 2 and 3.

The accommodation process of line guide arms 144 and 146 by the line guide arm holder 134 will now be described.

As best seen in FIG. 3, when the holder 134 is positioned at outermost right end, the retractable pin 136 is located adjacent outside of the line guide arm 144 and while the holder 134 is shifted laterally to the leftmost end, as heretofore explained, the line guide arm 146 slides over the tapered end 138 of the retractable pin 136 to be brought into right side thereof; when the line guide arm holder 134 is located in the middle of the cylinder 100, in the same manner, line guide arms 144, 146 are received by the line guide arm holder 134 one by one. A pair of line guide arms 144 and 146 are finally accommodated in parallel as shown in FIG. 2. The tapered end 138 of the retractable pin 136 helps accommodation of the line guide arms 144 and 146 onto the line guide arm holder 134 by a smooth sliding of the arms 144 and 146 over the pins 136.

Simultaneously with the rotation of the handle 10, as heretofore explained, the driving gear 14 which is partially meshing with the spool gear 16 is restored to a full meshing therewith, whereby the rotation of driving gear 14 is transmitted to the spool shaft 8 via the spool gear 16 to thereby shift the spool shaft 8 toward the projection 6' of the spool 6 such that the projection 8' of the spool shaft 8 is brought in to engagement with the projection 6', whereby the spool 6 becomes rotatable by the shaft 8. A fishing line is smoothly wound in around the spool 6, through a gap thus created by a pair of parallel line guide arms 144 and 146, as best seen in FIGS. 2 and 4, while the line guide arm holder 34 is reciprocally moving in lateral direction, and over a line guide cover 137.

What we claim is:

1. A double-bearing fishing reel comprising:
   a casing;
   a handle shaft rotatably attached to said casing;
   a handle for rotating said handle shaft attached thereto;
   a drive gear means mounted on said handle shaft;
   a spool shaft rotatably and axially slidably mounted on said casing;
   a spool and a spool gear means mounted on said spool shaft and meshable with said drive gear means;
   an operating lever means attached to said casing for engaging said spool gear means with said drive gear means for causing said spool to be driven by rotation of said handle and for disengaging said spool gear means from said drive gear means for causing said spool to be freely rotatable on said spool shaft;
   a traverse cam shaft rotatably and axially slidably mounted on said casing;
   a traverse cam and a traverse cam gear means mounted on said traverse cam shaft, said traverse cam gear means being meshable with said drive gear means;
   a traverse cam guide cylinder mounted on said traverse cam;
   a level winder including a level winder guide means mounted on and rotatable with said traverse cam guide cylinder, said level winder guide means being laterally reciprocal along said traverse cam cylinder, said level winder guide means having an integral slant arm, a line guide arm holder on said slant arm, and a pair of retractable pins reciprocally held in said line guide arm holder;
   a pair of line guide arms, each said line guide arm having first and second ends, each said first end being rotatably attached to said casing, and each said second end being engageable by said pair of retractable pins for holding said pair of line guide arms in parallel when said level winder guide means is reciprocated along said traverse cam cylinder;
   biasing means for biasing said pair of line guide arms apart to form a substantially V-shape when said pair of line guide arms are not held in parallel by said pair of said retractable pins; and
   means for engaging and disengaging said traverse cam gear means with said traverse cam for reciprocally moving said level winder guide means along said traverse cam cylinder when said cam gear means meshes with said drive gear mean for rotation by said handle.

2. A fishing reel as in claim 1, wherein said means for engaging and disengaging said traverse cam gear means with said traverse cam includes an inside gear attached to said casing and having a curved arm with a projection thereon, and a third link member having at one edge thereof a hole into which said projection of said curved arm of said inside gear is inserted, said third link member having at the other edge thereof a V-shaped groove receiving a hooked leaf spring therein and a tapered cam positioned thereon, and a traverse cam shaft bushing having a V-shaped groove engageable with said hooked leaf spring being accommodated in said third link member, and a resilient means for rotating said cam shaft bushing clockwise or counter-clockwise, said cam shaft bushing being connected to said traverse cam guide cylinder mounted on said traverse cam and a holder plate provided with a bifurcated leaf spring for holding a collar of said traverse cam shaft from underneath thereof and with a slit defined therein at a right angle to a bifurcated leaf spring in which said tapered cam of said third link member is inserted for shifting said traverse cam shaft gear away from said traverse cam for disengagement therewith when said cam touches slidingly on the surface of the bifurcated leaf spring while said third link member is shifted, and means for actuating said traverse cam guide cylinder to be rotated therewith.

3. A fishing reel as in claim 2, wherein said means for actuating said traverse cam shaft bushing further includes a hooked end of said hooked leaf spring, said hooked end of said hooked leaf spring being in engagement with said V-shaped groove defined in said traverse cam shaft bushing.

4. A fishing reel as in claim 2, wherein said operating lever means comprises an operating lever connected to a lever gear mounted on a spool sleeve through a connecting means, an operating gear which is rotatably attached to said casing, said operating gear being meshable with said lever gear and having a cylinder body around which a torsion spring is mounted, said cylinder body having an arm having an under surface thereof, said under surface having a tapered portion being engageable with said spool gear means for partial disengagement with said drive gear means operable by said handle, and said inside gear is provided with a base having teeth thereon meshable with said operating gear.

* * * * *